2,790,165
Patented Apr. 23, 1957

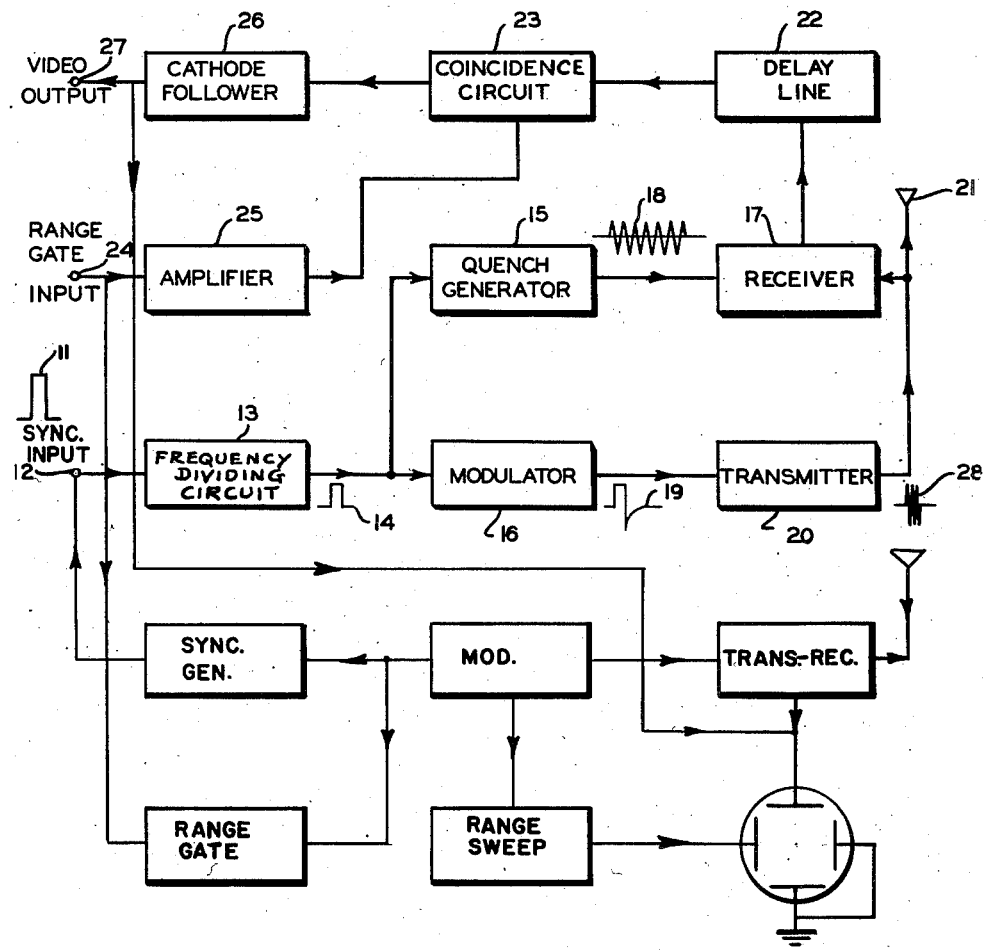

2,790,165

SUPER-REGENERATIVE RECEIVER

Jesse R. Lien, Los Angeles, Calif., assignor, by mesne assignments, to the United States of America as represented by the Secretary of the Navy Application February 13, 1946, Serial No. 647,392

6 Claims. (Cl. 343—6.5)

This invention relates to a super-regenerative radio frequency receiver and more particularly to a locked quench circuit for a super-regenerative radio frequency receiver.

The ability to distinguish friend from foe is essential to any military action. Thus apparatus for challenging and classifying radar-detected objects is vitally necessary. The equipment used for recognition or identification of ship or aircraft detected by radar is commonly classified as IFF a generic term meaning Identification Friend or Foe. A complete installation of this equipment generally consists of a challenging unit known as an interrogation-responser usually synchronized to the associated radar system but operating on a different frequency from that of the radar system and an identification unit known as a transpondor, which receives the interrogating pulse, amplifies it, and causes it to trigger a transmitter, which returns a pulse reply directly to the challenging set. If this reply, which is observed on a radar cathode-ray tube, conforms with a predetermined code, the target is friendly. Some installations may only use the transpondor unit.

The pulse repetition frequency of the IFF system is governed by that of the radar system, so that each IFF reply is synchronized with its corresponding target echo on the indicator. The interrogator is triggered by a synchronizing voltage from the radar set; so each IFF interrogation pulse is transmitted at the same instant as a radar pulse or follows the radar pulse by a predetermined interval of time. However there may not be an IFF interrogation pulse corresponding to every radar pulse, for a frequency divider in the interrogator may set the IFF interrogation rate equal to some submultiple of the radar pulse repetition frequency. This reduction of the pulse repetition frequency is necessary to prevent failure of the IFF system whenever a great number of stations try to trigger the transpondor at nearly the same time. The inherent recovery time required by the electrical circuits in the transpondor sets a maximum response rate; if an attempt is made to trigger the transpondor more rapidly, it will not answer every interrogation.

When the resonant frequency of the input circuit is swept through the carrier frequency of the interrogator, the transpondor transmits an identifying reply that the responsor can receive. The resonant frequency of the transpondor returns to the frequency of any specific challenging signal every three seconds, and the bandwidths of the transpondor and responsor allow approximately a one-half-second reply period during each frequency sweep. Therefore the IFF reply consists of several hundred pulses which are superposed on the screen of the radar oscilloscope, thus appearing as a single pip lasting one-half-second every three seconds.

Due to the frequency at which IFF equipment operates and the amplification desired in a single stage, super-regenerative receivers with quench circuits are used as the amplifiers. Heretofore, as soon as the equipment was energized, whether actively engaged in identification or in a standby attitude, the quench oscillator was in constant operation. This fact presented certain undesirable characteristics, such as, the radiation of considerable radio frequency energy which did serve as a beacon for enemy planes, and jitter of the received signal due to lack of synchronization between the interrogation pulse and the quench oscillations.

In accordance with the present invention and as is explained more fully hereinafter, the above mentioned difficulties are substantially eliminated.

A principal object of the present invention is to provide in a super-regenerative receiver a quench "gated" on for a time duration equal to the maximum range of the sweep utilized in the ranging circuits of the associated radar.

A further object of this invention is to provide in an IFF system a means for synchronizing the beginning of the receiver quench oscillations with the IFF interrogation pulse, thus substantially eliminating jitter from the reply pulse.

A still further object of this invention is to provide in an IFF system means for minimizing the radiation due to the super-regenerative receiver quench oscillator.

These and other objects will be apparent from the following specification when taken with the accompanying drawing which is a block diagram of an interrogator-responsor unit employing the above-mentioned principles.

Referring now to the drawing, the voltage synchronizing pulse 11 from the associated search radar is applied through an input terminal 12 to frequency dividing circuit 13. Voltage pulse 14 from dividing circuit 12, occuring at a submultiple of the frequency of pulse 11, is applied simultaneously to quench generator 15 and modulator 16. Quench generator 15 then delivers to super-regenerative receiver 17 a train of quench oscillations 18 for a predetermined duration of time substantially equal to duration of time of the maximum range of the sweep utilized in the ranging circuits of the associated radar. In the case of the present invention, the operation time of the quench 18 has been reduced to approximately eight percent (8%) of the total possible time, obviously a great reduction of radiation.

Simultaneously with quench generator 15, modulator 16 is triggered, voltage pulse 19 from modulator 16 fires transmitter 20 and the interrogation pulse 28 is radiated from antenna 21.

The returned signal from the transpondor in the craft being interrogated is picked up by antenna 21 and fed to the sensitized super-regenerative receiver 17. The signal is amplified and fed through delay line 22 to coincidence circuit 23. Coincidence circuit 23 receiving the signal also receives a range gate input voltage pulse from terminal 24 after amplification in amplifier 25. The return signal (if coincident with the range gate) then passes through cathode follower 26 to the video output terminal 27 from which it may be fed to the cathode ray tube of the associated radar or to a separate cathode ray tube indicator.

The advantages of the present invention, a locked quench, "gated" on for a duration of time equal to the maximum time duration of the sweep utilized in the ranging circuits of the associated radar, substantially reduces the radiation of the quench frequency, and effectively eliminates range jitter of the reply pulse normally encountered with super-regenerative receivers. By initiating the train of quench cycles coincident with the interrogation pulse the reply pulse doesn't jitter but jumps from quench cycle to quench cycle as the range between the interrogator-responsor in the challenging craft and the transpondor in the challenged craft changes.

Thus, it is to be clearly understod that the description and illustrations of the invention made above has been given only by way of example and not as a limitation on the scope of the invention as set forth in the objects and the accompanying claims.

What is claimed is:

1. In a radio pulse object detecting system having a target display device employing a linear time base for determining the range of reflecting targets, means for periodically radiating interrogation pulses, a super-regenerative receiver including a quench circuit, means for activating said quench circuit in synchronism with the radiation of said interrogation pulses, the period of activation of said last-mentioned circuit being equal to the duration of the linear time base of said target display device.

2. In a radio pulse object detecting system having a cathode ray tube display device and means for generating sweep voltages therefor, an interrogation-responsor unit including a super-regenerative receiver, a transmitter for radiating interrogation pulses, a quench voltage generator coupled to said receiver and means for applying a synchronizing pulse to said quench generator and to said transmitter whereby said transmitter and said quench generator are simultaneously activated, said generator when activated applying a quench voltage to said receiver for a time interval equal to the duration of said sweep voltages.

3. In a radio pulse object detecting system having a cathode ray tube as the target display device, means for periodically radiating interrogation pulses, a super-regenerative receiver adapted to detect the replies to said pulses, a quenching circuit included in said receiver and means operative coincidentally with the radiation of said interrogation pulses for rendering said quenching circuit effective for a predetermined time interval, said time interval being equal to the duration of the sweep voltages on the deflecting electrodes of said cathode ray tube.

4. In combination with a radio pulse object detecting apparatus having as its target display indicator a cathode ray tube, means for periodically radiating interrogation pulses along with the search pulses radiated from said object detecting apparatus, a super-regenerative receiver for detecting and amplifying reply pulses transmitted from targets responding to said interrogation pulses, said super-regenerative receiver having as a component thereof a source of quenching oscillations for controlling the regeneration of said receiver and thereby its amplification, means for coupling amplified reply pulses to one pair of deflecting electrodes of said cathode ray tube, and means for rendering said source of quenching oscillations operative coincidentally with the radiation of each interrogation pulse to minimize any time-jitter in the display of reply pulses from targets responding to said interrogation pulses.

5. In combination with a radio pulse object detecting system having as its target display indicator a cathode ray tube whose beam deflection in a first direction is achieved by the application of a sweep voltage having a linearly varying amplitude portion to a first pair of opposite electrodes, means for periodically radiating interrogation pulses, a super-regenerative receiver for detecting reply pulses transmitted from targets responding to said interrogation pulses, said regenerative receiver including a quenching generator for controlling its amplification characteristics, means for activating said generator coincidentally with the radiation of each interrogation pulse and for a time corresponding approximately to the duration of the linearly varying amplitude portion of said sweep voltage, and means for coupling the output of said super-regenerative receiver to a second pair of opposite electrodes of said cathode ray tube for deflecting said cathode ray beam in a second direction.

6. In combination with a radio pulse object detecting system having as its target display indicator a cathode ray tube whose beam deflection in a first direction is achieved by the application of a sweep voltage having a linearly varying amplitude portion to a first pair of deflecting electrodes, means for periodically radiating interrogation pulses, a super-regenerative receiver for detecting reply pulses transmitted from targets responding to said interrogation pulses, said super-regenerative receiver having a quenching oscillator for controlling its regeneration and amplification, means for activating said quenching oscillator in synchronism with the radiation of each interrogation pulse and at a fixed point in the cycle of said linearly varying sweep voltage and for deactivating said quenching oscillator at approximately the end of said sweep voltage, whereby only those reply pulses transmitted from targets within a predetermined range are substantially amplified by said super-regenerative receiver, and means for coupling said last-mentioned pulses to a second pair of deflecting electrodes of said cathode ray tube to deflect the beam in a second direction which is at right angles to said first direction.

References Cited in the file of this patent

UNITED STATES PATENTS

| | | |
|---|---|---|
| 2,415,667 | Wheeler | Feb. 11, 1947 |
| 2,431,344 | Reeves | Nov. 25, 1947 |
| 2,453,970 | Charrier | Nov. 16, 1948 |
| 2,460,202 | Tyson | Jan. 25, 1949 |
| 2,466,711 | Kenyon | Apr. 12, 1949 |
| 2,531,393 | Burnight | Nov. 28, 1950 |
| 2,536,801 | Emerson | Jan. 2, 1951 |
| 2,540,087 | Barchok | Feb. 6, 1951 |

FOREIGN PATENTS

| | | |
|---|---|---|
| 461,749 | Great Britain | Feb. 23, 1937 |